(12) United States Patent
Pepke

(10) Patent No.: US 11,429,375 B2
(45) Date of Patent: Aug. 30, 2022

(54) METHOD FOR EXCHANGING A FIRST EXECUTABLE PROGRAM CODE AND A SECOND EXECUTABLE PROGRAM CODE, AND A CONTROL UNIT

(71) Applicant: Robert Bosch GmbH, Stuttgart (DE)

(72) Inventor: Jan Pepke, Remseck A.N. (DE)

(73) Assignee: Robert Bosch GmbH, Stuttgart, NY (US)

( * ) Notice: Subject to any disclaimer, the term of this patent is extended or adjusted under 35 U.S.C. 154(b) by 169 days.

(21) Appl. No.: 16/969,802

(22) PCT Filed: May 9, 2019

(86) PCT No.: PCT/EP2019/061937
§ 371 (c)(1),
(2) Date: Aug. 13, 2020

(87) PCT Pub. No.: WO2019/224010
PCT Pub. Date: Nov. 28, 2019

(65) Prior Publication Data
US 2020/0371776 A1    Nov. 26, 2020

(30) Foreign Application Priority Data
May 23, 2018    (DE) ............ 10 2018 208 096.8

(51) Int. Cl.
*G06F 9/44*    (2018.01)
*G06F 8/654*    (2018.01)
*G06F 3/06*    (2006.01)

(52) U.S. Cl.
CPC ............ *G06F 8/654* (2018.02); *G06F 3/0604* (2013.01); *G06F 3/065* (2013.01); *G06F 3/068* (2013.01); *G06F 3/0652* (2013.01)

(58) Field of Classification Search
CPC ...... G06F 3/0604; G06F 3/065; G06F 3/0652; G06F 3/068; G06F 8/654
(Continued)

(56) References Cited

U.S. PATENT DOCUMENTS 6,442,067 B1    8/2002  Chawla et al.
6,640,334 B1 *  10/2003 Rasmussen ........... G06F 9/4401
                                                717/172
(Continued)

FOREIGN PATENT DOCUMENTS

JP    2006106914 A    4/2006
JP    2009102003 A    5/2009
(Continued)

OTHER PUBLICATIONS

Truong et al., "Poster Abstract: Trust Evaluation for Data Exchange in Vehicular Networks", 2017, ACM, pp. 325-326. (Year: 2017).*
(Continued)

*Primary Examiner* — Ted T. Vo
(74) *Attorney, Agent, or Firm* — Norton Rose Fulbright US LLP; Gerard Messina

(57) ABSTRACT

A method is described for exchanging a first executable program code and a second executable program code, as well as a control unit, including an active storage medium. The active storage medium contains the first executable program code for operating the control unit. A passive storage medium includes the second executable program code for operating the control unit. A data packet control unit, which is configured to exchange the first program code and the second program code, based on the method, is also described.

8 Claims, 3 Drawing Sheets

(58) Field of Classification Search
USPC .................................................. 717/168–178
See application file for complete search history.

(56) References Cited

U.S. PATENT DOCUMENTS

| | | | | |
|---|---|---|---|---|
| 6,687,784 B2* | 2/2004 | Douniwa | ............ | G06F 12/0246 |
| | | | | 711/E12.008 |
| 7,281,104 B1* | 10/2007 | Tsypliaev | ................ | G06F 3/067 |
| | | | | 714/E11.122 |
| 8,239,852 B2* | 8/2012 | Etchegoyen | .............. | G06F 8/60 |
| | | | | 717/172 |
| 8,924,952 B1 | 12/2014 | Hou | | |
| 2004/0040020 A1 | 2/2004 | Yang | | |
| 2004/0042269 A1* | 3/2004 | Tamura | ............... | G11C 11/5642 |
| | | | | 365/185.12 |

FOREIGN PATENT DOCUMENTS

| | | |
|---|---|---|
| JP | 2011003020 A | 1/2011 |
| JP | 2013205933 A | 10/2013 |
| JP | 2017097851 A | 6/2017 |

OTHER PUBLICATIONS

OS and the Basic 1st Ed. : The Basis of Operating System and Networks for Cloud Computing, Corona Corporation Co., Ltd., 04, p. 159 and p. 10, Corona Publishing Co., Ltd., (2018).
International Search Report for PCT/EP2019/061937, dated Jul. 30, 2019.

\* cited by examiner

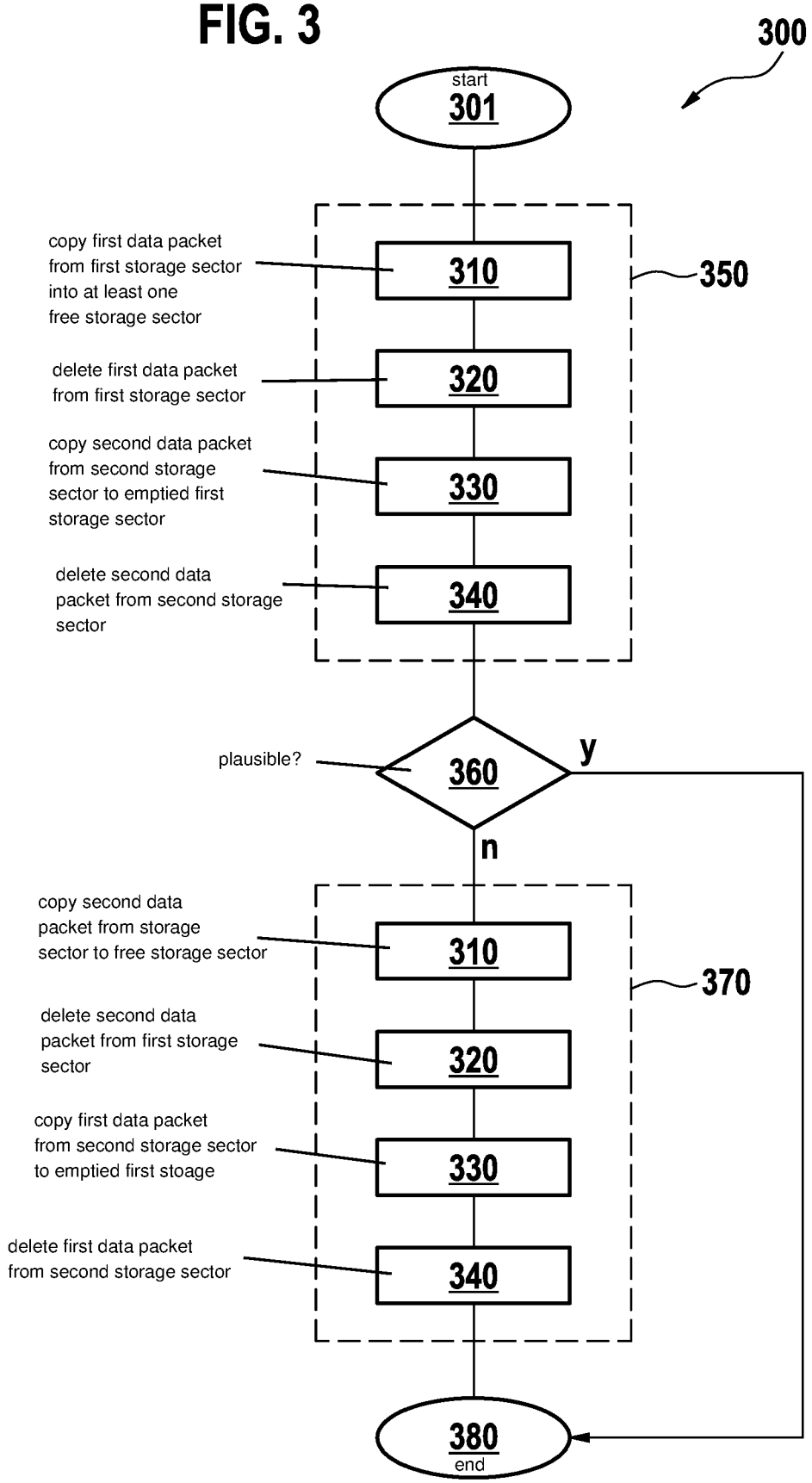

METHOD FOR EXCHANGING A FIRST EXECUTABLE PROGRAM CODE AND A SECOND EXECUTABLE PROGRAM CODE, AND A CONTROL UNIT

FIELD

The present invention relates to a method for exchanging a first executable program code and a second executable program code, as well as to a control unit, which includes at least one data packet control unit that is configured to exchange the first program code and the second program code in accordance with this.

SUMMARY

In accordance with an example embodiment of the present invention, the first executable program code is stored in an active storage medium in the form of first data packets; the active storage medium includes a plurality of first storage sectors; each of the first data packets is stored, in each instance, in a first memory sector; the second executable program code is stored in a passive storage medium in the form of second data packets; the passive storage medium includes a plurality of second storage sectors; each of the second data packets is stored, in each instance, in a second memory sector; and the passive storage element includes at least one free storage sector. In one example embodiment of the present invention, the method for exchanging a first executable program code and a second executable program code includes a step of copying a first data packet from a first storage sector of the active storage medium into the at least one free storage sector of the passive storage medium. The method further includes a step of emptying the one first storage sector of the active storage medium, by deleting the one first data packet from the one first storage sector; a step of copying a second data packet from a second storage sector of the passive storage medium into the emptied, first storage sector of the active storage medium; and a step of emptying the one second storage sector of the passive storage medium, by deleting the one second data packet from the one second storage sector. The method additionally includes repeatedly executing the steps mentioned above, until all of the first data packets of the first executable program code are stored in the passive storage medium and all of the second data packets of the second executable program code are stored in the active storage medium; a first or second data packet being copied, in each instance, into a storage sector that is emptied in advance and/or is free.

For example, a so-called flash bank, which may store, for example, 2 Mbyte of data, is to be understood as an active and/or passive storage medium; other memory sizes also being possible. The active and/or passive storage medium is made up of storage sectors, which each store a subset of data. A storage sector stores, for example, 32 kByte of data. An active storage medium is to be understood as, for example, a storage medium, which contains a program code, such that it may be executed, for example, in conjunction with a processor, in order to operate a mechanical and/or electronic unit. A passive storage medium is to be understood as, for example, a storage medium, which is not connected to a processor and/or is used exclusively for storing a program code. Emptying a storage sector is to be understood as deleting all of the data, which are contained by the storage sector.

The example method of the present invention may have the advantage that a program code is backed up, before a new program code can be stored on the storage medium used. In addition, the method of the present invention has the advantage that only two storage media of approximately the same size are sufficient for replacement by the new program code and for backing up the old program code. A further advantage of the example method of the present invention is that at all times, both the first program code and the second program code are available, and that therefore, even in the case of unexpected, abnormal termination of an exchange of the first and second program code, the exchange may be subsequently resumed and/or, if necessary, canceled. This renders the exchange particularly robust with regard to faults.

The active storage medium and the passive storage medium are preferably contained by a control unit, which is configured for operating a vehicle; and the method is designed to exchange the first program code for operating the vehicle with the aid of the control unit and the second program code for operating the vehicle with the aid of the control unit; the method being carried out, in particular, when the control unit is temporarily not being used for operating the vehicle.

A step of checking the plausibility of the second program code is preferably provided after the exchange; the exchange being reversed, if the plausibility checking fails; in particular, the reversed exchange being carried out in accordance with the method of the present invention.

The control unit of the present invention includes an active storage medium; the active storage medium including a plurality of first storage sectors; the active storage medium containing a first executable program code, in the form of first data packets, for operating the control unit, such that each of the first data packets is stored, in each instance, in a first storage sector. The control unit further includes a passive storage medium; the passive storage medium including a plurality of second storage sectors; the passive storage medium containing a second executable program code, in the form of second data packets, for operating the control unit, such that each of the second data packets is stored, in each instance, in a second storage sector; the passive storage element including at least one free storage sector. In addition, the control unit includes a data packet control unit, which is configured to exchange the first program code and the second program code, based on the method of the present invention. Furthermore, the control unit includes an execution unit, which is configured to carry out operation of the control unit with the aid of, in each instance, the program code contained by the active storage medium.

An advantage of this is that with the aid of the data packet control unit, an exchange between the first executable program code and the second executable program code may be carried out in a robust and reliable manner, without, in each instance, one of the two executable program codes having to be temporarily stored in its entirety and deleted. This reduces the number of additional storage units within the control unit and, therefore, saves space and money in the end.

The control unit preferably includes an interface, which is configured to transmit and/or to receive the first and/or second program code. This is to be understood to mean, for example, that the control unit is connected to an external transmitting and/or receiving unit, and that the external transmitting and/or receiving unit may transmit and/or receive the first and/or second program code, e.g., wirelessly, as data values. The transmitted and/or received data values are transmitted again between the interface and the external interface with the aid of a cable, for example.

An advantage of this is that the first and/or second executable program code may be transmitted to the control unit over the air, that is, wirelessly, and from any desired source (cloud, server, etc.). In this manner, for example, a second executable program code may be transmitted to the control unit as an update of the first executable program code, which is necessary for operating the control unit already installed.

The control unit is preferably contained by a vehicle. In addition, the control unit is configured to operate the vehicle with the aid of the first and/or second program code.

In particular, in (road) vehicles, control units, which execute driving assistance functions and/or functions increasing safety and/or further functions, are needed more and more. In this context, it is necessary again and again for an executable program code used for this to be updated and/or exchanged. In this connection, the updated program code may be transmitted over the air, that is, wirelessly, from any desired source (cloud, server, etc.) to the control unit. If the control unit is contained, for example, by a vehicle, then the exchange of the program code may consequently take place outside of a garage; the safety, as well as the functionality, of the vehicle not being reduced after a successful or unsuccessful exchange. In this connection, the control unit of the present invention, which includes, in particular, the data packet control unit, is highly advantageous on the basis of the variants mentioned above.

The control unit preferably includes a detection unit, which determines if the vehicle is being operated by the control unit as a function of the first and/or second program code; the data packet control unit only carrying out an exchange of the first program code and the second program code, when the vehicle is not being operated by the control unit as a function of the first and/or second program code.

An advantage of this is that the exchange of the first executable program code and the second executable program code only takes place, when the vehicle is not actively using the control unit. In particular, this is the case, for example, when the vehicle is not moving and/or is shut off. In this manner, it is ensured that no safety risk to the vehicle and/or to occupants of the vehicle results from not using the control unit.

The control unit preferably includes a plausibility checking unit, which is configured to carry out a plausibility check of the second program code after the exchange; the exchange being reversed with the aid of the data packet control unit, if the plausibility check fails.

This advantageously increases the reliability of the control unit.

In particular, the control unit may include further components, which are necessary for operating the control unit, but are not specified and explained further due to a lack of relevance to the actual invention.

Advantageous further refinements of the present invention are described herein.

BRIEF DESCRIPTION OF THE DRAWINGS

Exemplary embodiments of the present invention are represented in the figures and are explained in more detail below.

FIG. 3 shows an exemplary embodiment of the method according to the present invention, in the form of a flow chart.

DETAILED DESCRIPTION OF EXAMPLE EMBODIMENTS

Figure 1:
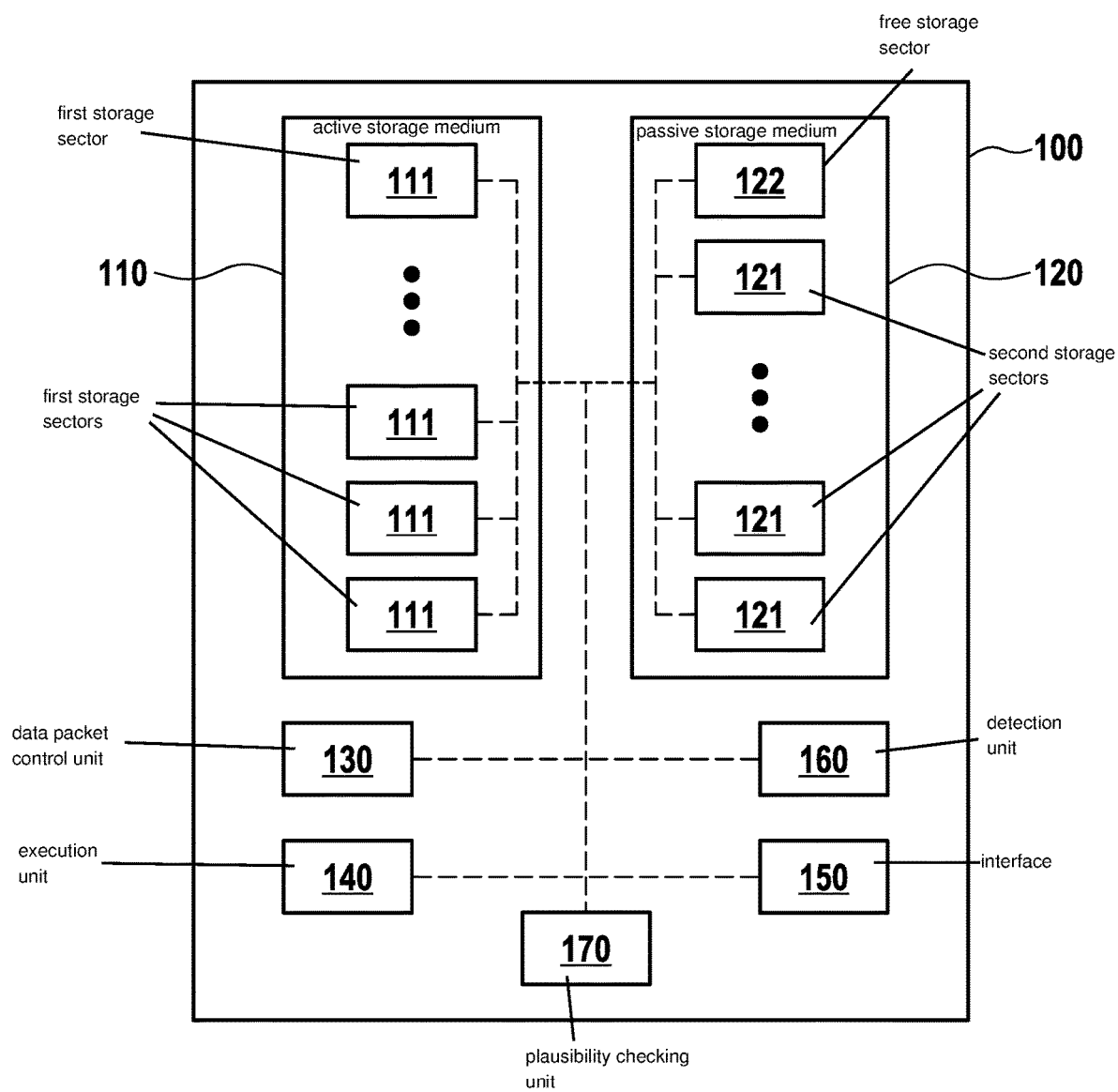
FIG. 1 shows a schematic exemplary embodiment of the control unit according to the present invention.

FIG. 1 shows a schematic representation of control unit 100 of the present invention, which includes an active storage medium 110, a passive storage medium 120, a data packet control unit 130 and an execution unit 140. In an alternative embodiment, control unit 100 additionally includes an interface 150 and/or a detection unit 160 and/or a plausibility checking unit 170. In addition, control unit 100 includes a transmission device (shown here as a dotted line connection), which is configured to transmit data and/or signals between the individual components (110, 120, 130, 140, 150, 160, 170).

Active storage medium 110 includes a plurality of first storage sectors 111; the active storage medium 110 containing a first executable program code, in the form of data packets, for operating control unit 100, such that each of the first data packets is stored, in each instance, in a first storage sector 111.

Passive storage medium 120 includes a plurality of second storage sectors 121; the passive storage medium 120 containing a second executable program code, in the form of second data packets, for operating control unit 100, such that each of the second data packets is stored, in each instance, in a second storage sector 121. In addition, passive storage element 120 includes at least one free storage sector 122.

Data packet control unit 130 is configured to exchange the first program code and the second program code, based on method 300 of the present invention. To that end, data packet control unit 130 includes, e.g., a processor, main memory store, and suitable software, which is designed to control it.

Execution unit 140 is configured to carry out operation of control unit 100 with the aid of, in each instance, the program code contained by active storage medium 110. To that end, the execution unit includes, e.g., a processor, main memory store and suitable software, which, on the basis of the first or second executable program code, generates a signal and supplies this signal via a suitable interface in such a manner, that this signal may be used for operating a mechanical and/or electronic unit.

Interface 150 is configured to transmit and/or to receive the first and/or second program code. To this end, interface 150 either includes a transmitting and/or receiving unit itself, or is connected to a transmitting and/or receiving unit with the aid of a cable; the transmitting and/or receiving unit not being contained by control unit 100.

Detection unit 160 is configured to determine if the vehicle is being operated by control unit 100 as a function of the first and/or second program code. To that end, detection unit 160 includes, e.g., a processor, main memory store, as well as suitable software, which is designed to detect this.

Plausibility checking unit 170 is configured to carry out a plausibility check 360 of the second program code after the exchange. To that end, plausibility checking unit 170 includes, e.g., a processor, main memory store, as well as suitable software, which is designed to check the plausibility of this.

Figure 2:
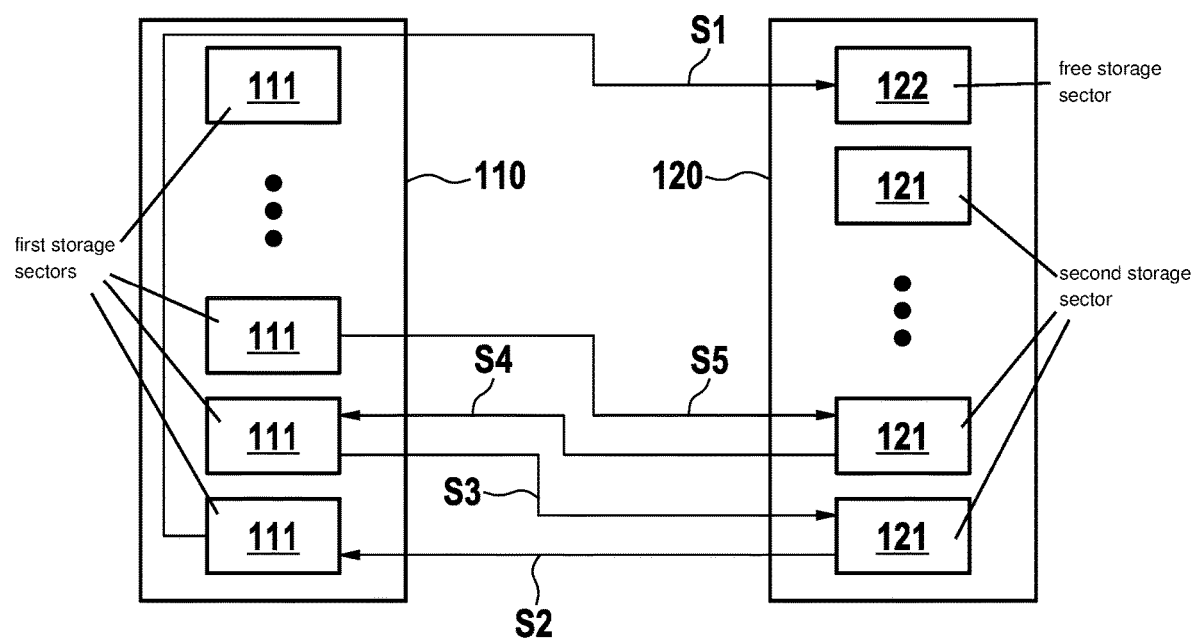
FIG. 2 shows a schematic exemplary embodiment of the method according to the present invention.

FIG. 2 shows a schematic representation of the method 300 of the present invention for exchanging a first executable program code and a second executable program code. In this context, the first executable program code is stored in an active storage medium 110 in the form of first data packets; active storage medium 110 including a plurality of first storage sectors 111; and each of the first data packets being stored, in each instance, in a first memory sector 111. The second executable program code is stored in a passive storage medium 120 in the form of second data packets; passive storage medium 120 including a plurality of second storage sectors 121; each of the second data packets being stored, in each instance, in a second storage sector 121; and the passive storage element including at least one free storage sector 122.

In a first step S1, a first data packet is copied 310 from a first storage sector 111 of active storage medium 110 into the at least one free storage sector 122 of passive storage medium 120.

In a step S1' (not shown in FIG. 2), the one first storage sector 111 of active storage medium 110 is emptied 320, by deleting the one first data packet from the one first storage sector 111.

In a step S2 a second data packet is copied 330 from a second storage sector 121 of passive storage medium 120 into emptied, first storage sector 111 of active storage medium 110.

In a step S2' (not shown in FIG. 2), the one second storage sector 121 of passive storage medium 120 is emptied 340, by deleting the one second data packet from the one second storage sector 121.

Repeated execution 350 of above-mentioned steps 310-340 (here, S3, S4, etc.; all of the intermediate steps S3', S4', etc. not being shown in FIG. 2), until all of the first data packets of the first executable program code are stored in passive storage medium 120 and all of the second data packets of the second executable program code are stored in active storage medium 110; a first or second data packet being copied 310, 330, in each instance, into a storage sector 111, 121, 122 that is emptied in advance and/or is free.

FIG. 3 shows an exemplary embodiment of a method 300 for exchanging a first executable program code and a second executable program code in a control unit 100, which is assumed, here, by way of example, to be a control unit 100 of a vehicle.

Method 300 starts in step 301. This takes place in that, for example, with the aid of interface 150, a second executable program code is received and stored in the passive storage medium 120 that is empty to begin with. In one specific embodiment, as an alternative, or in addition, it is determined in advance by detection unit 160, if an exchange of the first executable program code and the second executable program code is able to take place in a control unit 100. If the exchange is not able to take place (for example, since one of the two executable program codes is being actively executed), method 300 is not started. Otherwise, the method is started, and step 310 follows.

In step 310, a first data packet is copied from a first storage sector 111 of active storage medium 110 into the at least one free storage sector 122 of passive storage medium 120.

In step 320, the one first storage sector 111 of active storage medium 110 is emptied, by deleting the one first data packet from the one first storage sector 111.

In step 330, a second data packet is copied from a second storage sector 121 of passive storage medium 120 into emptied, first storage sector 111 of active storage medium 110.

In step 340, the one second storage sector 121 of passive storage medium 120 is emptied, by deleting the one second data packet from the one second storage sector 121.

After steps 310, 320, 330 and 340 have been executed for the first time, the steps 310, 320, 330 and 340 mentioned above are executed 350 repeatedly, until all of the first data packets of the first executable program code are stored in passive storage medium 120 and all of the second data packets of the second executable program code are stored in active storage medium 110.

In one possible specific embodiment, step 360, in which the plausibility of the second program code is checked after the exchange, is performed subsequently. This is to be understood to mean, for example, that the second executable program code is checked, on one hand, for its integrity, and/or, on the other hand, for its compatibility with the rest of the control unit, and/or, on the other hand, for its compatibility with other program codes in the vehicle. If the second executable program code is determined to be plausible, then step 380 follows subsequently. Otherwise, step 370 follows.

In step 370, the exchange is reversed, by repeating steps 310, 320 and 330, until all of the second data packets of the second executable program code are stored once more in passive storage medium 120 and all of the first data packets of the first executable program code are stored once more in active storage medium 110, in particular, in the correct order for executing the first executable program code.

In step 380, method 300 ends.

What is claimed is:

1. A method for exchanging a first executable program code and a second executable program code, the method comprising:
  (a) copying one first data packet of first data packets from one first storage sector of a plurality of first storage sectors of an active storage medium into at least one free storage sector of a passive storage medium, wherein the first executable program code is stored in an active storage medium in the form of the first data packets, the active storage medium including the plurality of first storage sectors, each of the first data packets being stored, in each instance, in a first storage sector of the first storage sectors, the second executable program code being stored in the passive storage medium in the form of second data packets, the passive storage medium including a plurality of second storage sectors, each of the second data packets being stored, in each instance, in a second storage sector of the second storage sectors, the passive storage element including at least one free storage sector;
  (b) emptying the one first storage sector of the active storage medium by deleting the one first data packet from the one first storage sector;
  (c) copying one second data packet of the second data packets from one second storage sector of the plurality of second storage sectors of the passive storage medium into the emptied one first storage sector of the active storage medium;
  (d) emptying the one second storage sector of the passive storage medium, by deleting the one second data packet from the one second storage sector; and
  repeatedly executing steps (a)-(d), until all of the first data packets of the first executable program code are stored in the passive storage medium and all of the second data packets of the second executable program code are stored in the active storage medium, a first data packet or a second data packet being copied, in each instance, into a first or second storage sector that is emptied in advance and/or is free.

2. The method as recited in claim 1, wherein the active storage medium and the passive storage medium are contained by a control unit, which is configured for operating a vehicle, and the method is configured to exchange the first program code for operating the vehicle using the control unit and the second program code for operating the vehicle using the control unit, wherein the method is carried out when the control unit is temporarily not being used for operating the vehicle.

3. The method as recited in claim 1, further comprising: after an exchange in which all of the first data packets of the first executable program code are stored in the passive storage medium and all of the second data packets of the second executable program code are stored in the active storage medium, checking a plausibility of the second program code, the exchange being reversed when the plausibility check fails.

4. A control unit, comprising:
a non-transitory active storage medium including a plurality of first storage sectors, the active storage medium containing a first executable program code in the form of first data packets, for operating the control unit, such that each of the first data packets is stored, in each instance, in a first storage sector of the first storage sectors;
a non-transitory passive storage medium including a plurality of second storage sectors, the passive storage medium containing a second executable program code in the form of second data packets, for operating the control unit, such that each of the second data packets is stored, in each instance, in a second storage sector of the second storage sectors, the passive storage medium including at least one free storage sector;
a data packet control unit which is configured to exchange the first program code and the second program code, the data packet control unit being configured to perform the following:
  (a) copy one first data packet of the first data packets from one first storage sector of the plurality of first storage sectors of the active storage medium into the at least one free storage sector of the passive storage medium;
  (b) empty the one first storage sector of the active storage medium by deleting the one first data packet from the one first storage sector;
  (c) copy one second data packet of the second data packets from one second storage sector of the plurality of second storage sectors of the passive storage medium into the emptied one first storage sector of the active storage medium;
  (d) empty the one second storage sector of the passive storage medium, by deleting the one second data packet from the one second storage sector; and
  repeat (a)-(d), until all of the first data packets of the first executable program code are stored in the passive storage medium and all of the second data packets of the second executable program code are stored in the active storage medium, a first data packet or a second data packet being copied, in each instance, into a first or second storage sector that is emptied in advance and/or is free;
an execution unit to carry out operation of the control unit using, in each instance, program code contained by the active storage medium.

5. The control unit as recited in claim 4, wherein the control unit includes an interface, which is configured to transmit and/or to receive the first and/or second program code.

6. The control unit as recited in claim 4, wherein the control unit is contained by a vehicle, and the control unit is configured to operate the vehicle using the first and/or second program code.

7. The control unit as recited in claim 6, wherein the control unit includes a detection unit which determines if the vehicle is being operated by the control unit as a function of the first and/or second program code, and the data packet control unit carries out an exchange of the first program code and the second program code only when the vehicle is not being operated by the control unit as a function of the first and/or second program code.

8. The control unit as recited in claim 4, wherein the control unit includes a plausibility checking unit which is configured to carry out a plausibility check of the second program code after the exchange, the exchange being reversed using the data packet control unit, if the plausibility check fails.

* * * * *